US012578708B2

(12) United States Patent
Kim et al.

(10) Patent No.: US 12,578,708 B2
(45) Date of Patent: Mar. 17, 2026

(54) DEVICE AND METHOD OF SETTING COMMUNICATION CHANNEL OF OHT, AND COMPUTER PROGRAM FOR THE METHOD

(71) Applicant: SEMES CO., LTD., Cheonan-si (KR)

(72) Inventors: Dasom Kim, Cheonan-si (KR); Taeuk Park, Cheonan-si (KR); Seungju Lee, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 478 days.

(21) Appl. No.: 18/108,654

(22) Filed: Feb. 12, 2023

(65) Prior Publication Data

US 2023/0297083 A1  Sep. 21, 2023

(30) Foreign Application Priority Data

Mar. 16, 2022 (KR) ........................ 10-2022-0032820

(51) Int. Cl.
G05B 19/418 (2006.01)

(52) U.S. Cl.
CPC .................... G05B 19/4185 (2013.01); G05B 2219/21005 (2013.01)

(58) Field of Classification Search
CPC ...... G05B 19/4185; G05B 2219/21005; H01L 21/67276; H01L 21/67294; H01L 21/67733; H01L 41/0803; H01L 21/67259; H01L 69/26; H04W 76/10
See application file for complete search history.

(56) References Cited

U.S. PATENT DOCUMENTS 6,092,678 A * 7/2000 Kawano ............ H01L 21/67733
                                                      340/685
2002/0009357 A1* 1/2002 Hanson ............. H01L 21/67259
                                                      414/940
2010/0239400 A1* 9/2010 Ishikawa ................ B65G 37/02
                                                      414/373

(Continued)

FOREIGN PATENT DOCUMENTS

KR         10-1527686         6/2015
KR      10-2020-0092394       8/2020

OTHER PUBLICATIONS

Office Action from the Korean Intellectual Property Office dated Aug. 7, 2023.

*Primary Examiner* — Kidest Worku

(57) ABSTRACT

Provided are a device and method of setting a communication channel of an overhead hoist transfer (OHT), and a computer program stored in a recording medium to execute the method. The method of setting a communication channel of an OHT includes checking, by a master parallel input/output (PIO) provided in the OHT, a logistics transfer task command of the OHT, checking, by the master PIO, position information corresponding to the logistics transfer task command, based on the logistics transfer task command, checking, by the master PIO, unique number information of a slave PIO corresponding to the logistics transfer task command, based on the logistics transfer task command and the position information, and setting, by the master PIO, a communication channel between the master PIO and the slave PIO, based on the unique number information of the slave PIO.

12 Claims, 7 Drawing Sheets

(56)            References Cited

U.S. PATENT DOCUMENTS

2015/0104276 A1*  4/2015  Lee .................... H01L 21/6735
                                               414/222.01
2015/0316924 A1*  11/2015 Oh ...................... H04B 10/114
                                               700/99
2021/0057254 A1*  2/2021  Kitamura ........... H01L 21/6773

* cited by examiner

DEVICE AND METHOD OF SETTING COMMUNICATION CHANNEL OF OHT, AND COMPUTER PROGRAM FOR THE METHOD

CROSS-REFERENCE TO RELATED APPLICATION

This application claims the benefit of Korean Patent Application No. 10-2022-0032820, filed on Mar. 16, 2022, in the Korean Intellectual Property Office, the disclosure of which is incorporated by reference herein in its entirety.

BACKGROUND

1. Field

The disclosure relates to a device and method of setting a communication channel of an overhead hoist transfer (OHT), and a computer program stored in a recording medium to execute the method.

2. Description of the Related Art

To produce finished products, several hundreds of processes are performed in a semiconductor product production process, and hundreds of thousands of logistics movements occur in a semiconductor manufacturing process. In the logistics transfer process, to prevent contamination, damage, delivery accidents, and the like of semiconductor materials, an overhead hoist transfer (OHT) as a logistics transfer automation system is used in a semiconductor manufacturing line. The OHT is an automation system for logistics transfer between numerous semiconductor processes by transferring a wafer placed in a front opening unified pod (FOUP) along rails installed on the ceiling to manufacturing equipment for each production process.

For communication between an OHT and equipment, communication channel setting between a master parallel input/output (PIO) provided in the OHT and a slave PIO provided in the equipment is an essential task. However, in a process of directly setting, by a field worker, a communication channel between a master PIO and a slave PIO by using separate equipment through IR communication, a human error occurs, an interference occurs in the IR communication depending on the position of equipment, and safety problems according to tasks by field workers occur.

SUMMARY

Provided are a device and method of setting a communication channel of an overhead hoist transfer (OHT), and a computer program stored in a recording medium to execute the method. However, such an objective is an example, and the scope of the present disclosure is not limited thereby.

Additional aspects will be set forth in part in the description which follows and, in part, will be apparent from the description, or may be learned by practice of the presented embodiments.

According to an aspect of the disclosure, a method of setting a communication channel of an OHT includes checking, by a master parallel input/output (PIO) provided in the OHT, a logistics transfer task command of the OHT, checking, by the master PIO, position information corresponding to the logistics transfer task command, based on the logistics transfer task command, checking, by the master PIO, unique number information of a slave PIO corresponding to the logistics transfer task command, based on the logistics transfer task command and the position information, and setting, by the master PIO, a communication channel between the master PIO and the slave PIO, based on the unique number information of the slave PIO The checking, by the master PIO, of the logistics transfer task command may include receiving, by the master PIO, the logistics transfer task command from an OHT control system (OCS).

The logistics transfer task command may include the position information, the unique number information of the slave PIO, and communication channel information.

The checking of the position information corresponding to the logistics transfer task command may include checking, by the master PIO, map information that is previously stored, and checking, by the master PIO, whether the OHT is located at a right position, based on the map information and the position information.

The map information may include position information of the OHT with respect to at least one piece of equipment corresponding to the logistics transfer task command.

The checking of whether the OHT is located at a right position may include checking the position information included in the logistics transfer task command, checking current position information of the OHT, and checking whether the OHT is located at a right position by comparing the position information included in the logistics transfer task command with the current position information, based on the map information.

The checking of the unique number information of the slave PIO may include, when the OHT is located at a right position, checking the position information included in the unique number information of the slave PIO corresponding to the logistics transfer task command.

The checking of the unique number information of the slave PIO may include transmitting, by the master PIO, a confirmation message to the slave PIO corresponding to the unique number information of the slave PIO, based on the unique number information of the slave PIO corresponding to the logistics transfer task command, and receiving, by the master PIO, a response message to the confirmation message from the slave PIO.

The checking of the unique number information of the slave PIO may further include recognizing, by the master PIO, the slave PIO corresponding to the logistics transfer task command, based on the response message.

The setting of the communication channel may include transmitting, by the master PIO, communication channel information to the slave PIO corresponding to the logistics transfer task command, and setting a communication channel between the master PIO and the slave PIO corresponding to the logistics transfer task command, based on the communication channel information.

According to another aspect of the disclosure, a non-transitory computer-readable recording medium having recorded thereon a program for executing the method described above.

According to another aspect of the disclosure, a device for setting a communication channel of an OHT includes a processor, wherein the processor is configured to check a logistics transfer task command of the OHT, check position information corresponding to the logistics transfer task command, based on the logistics transfer task command, check unique number information of a slave PIO corresponding to the logistics transfer task command, based on the logistics transfer task command and the position information, and set a communication channel between a master PIO and the slave PIO, based on the unique number information of the slave PIO.

The processor may be further configured to receive the logistics transfer task command from an OCS.

The logistics transfer task command may include the position information, the unique number information of the slave PIO, and communication channel information.

The processor may be further configured to control the master PIO to check map information that is previously stored, and check whether the OHT is located at a right position, based on the map information and the position information.

The map information may include position information of the OHT with respect to at least one piece of equipment corresponding to the logistics transfer task command.

The processor may be further configured to check the position information included in the logistics transfer task command, check current position information of the OHT, and check whether the OHT is located at a right position by comparing the position information included in the logistics transfer task command with the current position information, based on the map information.

The processor may be further configured to, when the OHT is located at a right position, check the position information included in the unique number information of the slave PIO corresponding to the logistics transfer task command.

The processor may be further configured to transmit a confirmation message to the slave PIO corresponding to the unique number information of the slave PIO, based on the unique number information of the slave PIO corresponding to the logistics transfer task command, receive a response message to the confirmation message from the slave PIO, and recognize the slave PIO corresponding to the logistics transfer task command, based on the response message.

The processor may be further configured to transmit communication channel information to the slave PIO corresponding to the logistics transfer task command, and set a communication channel between the master PIO and the slave PIO corresponding to the logistics transfer task command, based on the communication channel information.

Other aspects, features, and advantages than those described above will become apparent from the following drawings, claims, and detailed description of the disclosure

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
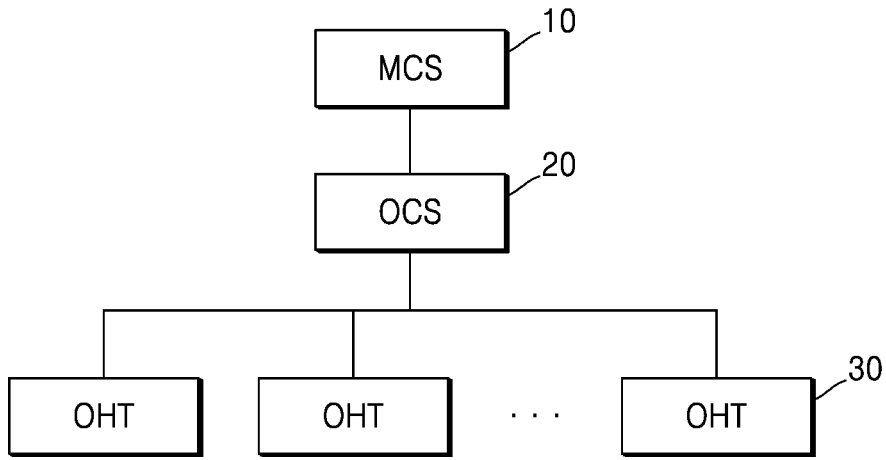
FIGS. 1 and 2 are, respectively, a block diagram and a perspective view schematically showing the configuration of a logistics transfer automation system employing an overhead hoist transfer (OHT) according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Various modifications may be applied to the present embodiments, and particular embodiments will be illustrated in the drawings and described in the detailed description section. The effect and features of the present embodiments, and a method to achieve the same, will be clearer referring to the detailed descriptions below with the drawings. However, the present embodiments may be implemented in various forms, not by being limited to the embodiments presented below.

Hereinafter, the disclosure will be described in detail with reference to the accompanying drawings, and in the description with reference to the drawings, the same or corresponding constituents are indicated by the same reference numerals and redundant descriptions thereof are omitted.

In the following embodiment, terms such as "first" and "second" are used herein merely to describe a variety of constituent elements, but the constituent elements are not limited by the terms. Such terms are used only for the purpose of distinguishing one constituent element from another constituent element. The expression of singularity in the specification includes the expression of plurality unless clearly specified otherwise in context. Furthermore, it will be further understood that the terms "comprises" and/or "comprising" used herein specify the presence of stated features or components, but do not preclude the presence or addition of one or more other features or components.

Sizes of components in the drawings may be exaggerated for convenience of explanation. For example, since sizes and thicknesses of components in the drawings are arbitrarily illustrated for convenience of explanation, the following embodiments are not limited thereto.

In the following embodiment, it will be understood that when a portion, such as an area, a component, a portion, a block or module, and the like, is referred to as being "on" another component, the component can be directly on the other component or intervening components, such as another area, component, block or module, and the like, may be present thereon. It will be understood that when a layer, region, or component is referred to as being "connected to" another layer, region, or component, it can be directly connected to the other layer, region, or component or indirectly connected to the other layer, region, or component via intervening layers, regions, or components.

Hereinafter, with reference to the accompanying drawings, the embodiment of the present invention will be described in detail so that a person skill in the art to which the present invention pertains can easily implement the invention.

Figure 2:
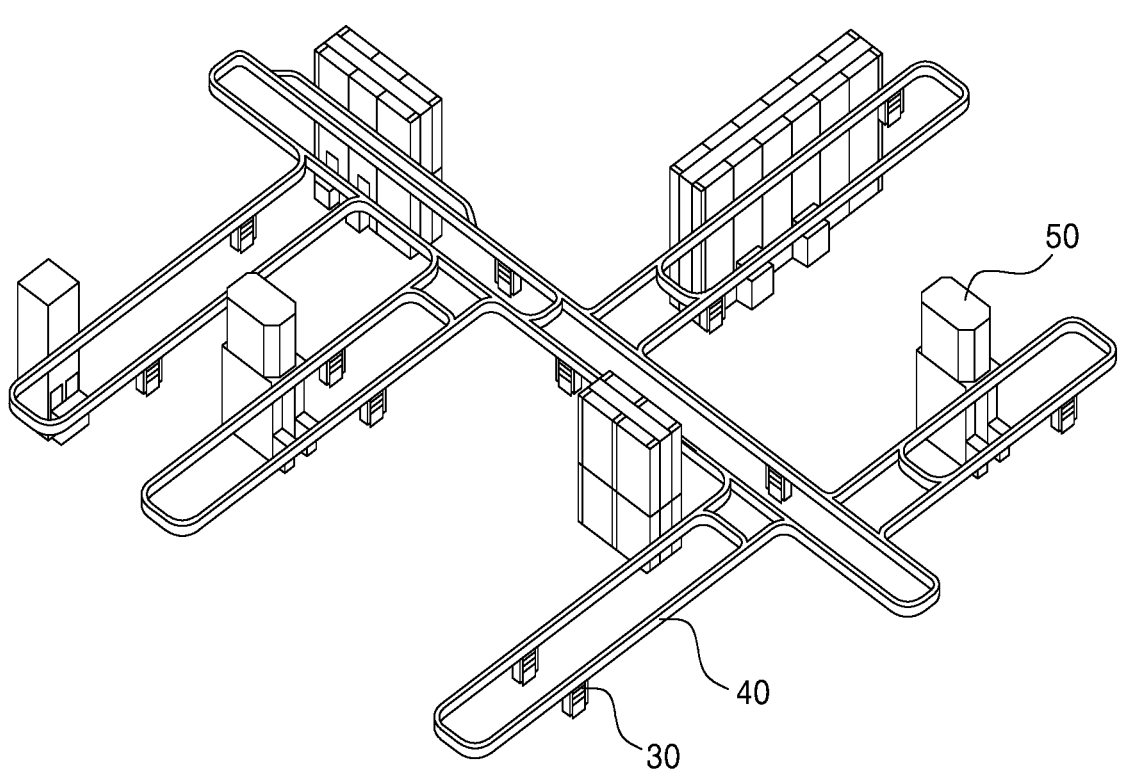

FIGS. 1 and 2 are, respectively, a block diagram and a perspective view schematically showing the configuration of a logistics transfer automation system employing an overhead hoist transfer (OHT) 30 according to an embodiment.

Referring to FIGS. 1 and 2 together, the OHT 30 according to an embodiment runs on a rail 40 installed on the ceiling and interfaces with an OHT control system (OCS) 20 for issuing a transfer task command by a wireless communication method. The OCS 20 receives a command about transfer according to a task process from a material control system (MCS) 10, and in response to the command of the MCS 10, searches for the shortest path from a starting point to a destination to complete a transfer task in the shortest time, selects an OHT located at an optimal position to perform the transfer task, and issues a transfer task command to the selected OHT. In response to the transfer task command of the OCS 20, the OHT 30 transfers logistics to a destination port to perform the transfer task from a port instructed by the OCS 20 to equipment 50 that is a target of the transfer task command.

Figure 3:
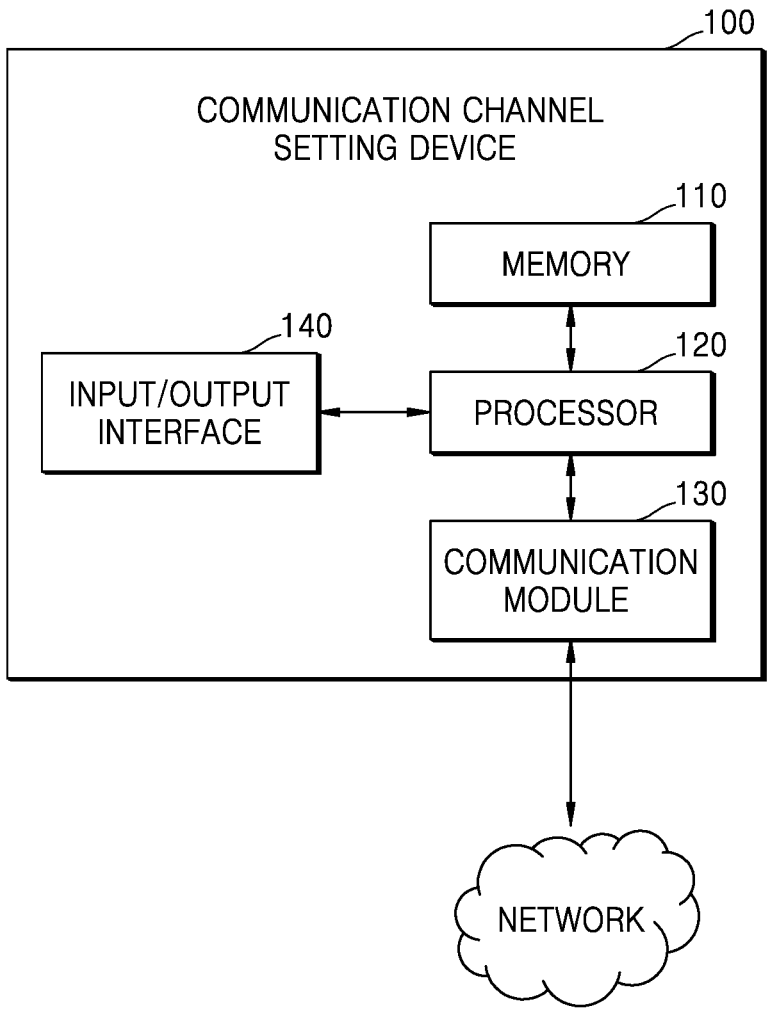
FIG. 3 is a block diagram showing the configuration and operation of a communication channel setting device according to an embodiment.
Figure 4:
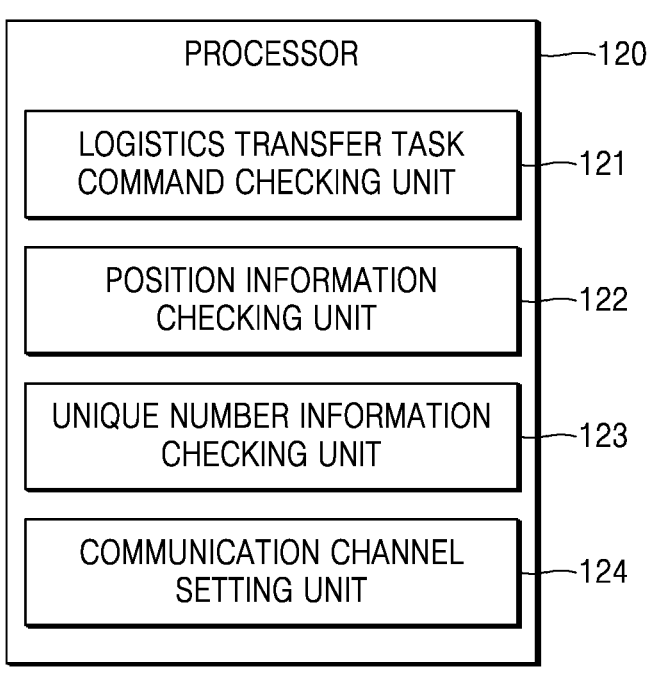
FIG. 4 is a flowchart showing the configuration of a processor of the communication channel setting device of FIG. 3.

FIG. 3 is a block diagram showing the configuration and operation of a communication channel setting device according to an embodiment, and FIG. 4 is a flowchart showing the configuration of a processor of the communication channel setting device of FIG. 3.

First, referring to FIG. 3, a communication channel setting device 100 according to an embodiment may include a memory 110, a processor 120, a communication module 130, and an input/output interface 140. However, the disclosure is not limited thereto, and the communication channel setting device 100 may further include other constituent elements and some constituent elements may be omitted. Some constituent elements of the communication channel setting device 100 may be separated into a plurality of devices, or a plurality of constituent elements of the communication channel setting device 100 may be incorporated into one device.

In an embodiment, the communication channel setting device 100 may be included in a master PIO. Furthermore, in an embodiment, the communication channel setting device 100 may be a master PIO.

The memory 110, as a computer-readable recording medium, may include permanent mass storage devices, such as random access memory (RAM), read only memory (ROM), and a disk drive. Furthermore, the memory 110 may temporarily or permanently store program code to control the communication channel setting device 100.

The processor 120 may check a logistics transfer task command of the OHT 30, check position information corresponding to the logistics transfer task command based on the logistics transfer task command, check unique number information of a slave PIO corresponding to the logistics transfer task command, based on the logistics transfer task command and the position information, and set a communication channel between a master PIO and a slave PIO based on the unique number information of the slave PIO.

The communication module 130 may provide a function to communicate with an external device through a network. As an example, a request generated by the processor 120 of the communication channel setting device 100 based on the program code stored in a recording device such as the memory 110 may be transferred to an external device through a network under the control of the communication module 130. Reversely, control signals, commands, messages, or the like provided under the control of a process of the external device may be received by the communication channel setting device 100 through the communication module 130 via a network. For example, the control signals, commands, messages, or the like of the external device received through the communication module 130 may be transferred to the processor 120 or the memory 110.

A communication method is not limited, and may include not only a communication method using a communication network (e.g., a mobile communication network, wired Internet, wireless Internet, a broadcasting network) to be included in a network, but also short-range wireless communication between devices. For example, the communication method according to an embodiment may include a communication method using orthogonal frequency-division multiplexing (OFDM). For example, the network may include one or more networks from among a personal area network (PAN), a local area network (LAN), a campus area network (CAN), a metropolitan area network (MAN), a wide area network (WAN), a broadband network (BBN), the Internet, and the like. Furthermore, the network may include one or more networks from network topology including a bus network, a start network, a ring network, a mesh network, a start-bus network, a tree or hierarchical network, and the like, but the disclosure is not limited thereto.

Furthermore, the communication channel setting device 100 according to the disclosure may include the input/output interface 140. The input/output interface 140 may be a device for interfacing with an input/output device. For example, the input device may include a device such as a keyboard, a mouse, or the like, and the output device may include a device such as a display for displaying a communication session of an application. As another example, the input/output interface 140 may include a device for interfacing with a device with an incorporated input/output function, such as a touch screen.

Furthermore, in some embodiments, the communication channel setting device 100 may include more constituent elements than the constituent elements of FIG. 1. For example, the communication channel setting device 100 may be implemented to include at least some of the input/output devices described above, or may further include other constituent elements, such as a battery and charging device for supplying power to internal constituent elements, various sensors, databases, and the like.

The internal configuration of the processor 120 of the communication channel setting device 100 according to an embodiment is described below in detail with reference to FIG. 4. For ease of understanding, it is assumed that the processor 120 described below is the processor 120 of the communication channel setting device 100 illustrated in FIG. 3.

The processor 120 of the communication channel setting device 100 according to an embodiment may include a logistics transfer task command checking unit 121, a position information checking unit 122, a unique number information checking unit 123, and a communication channel setting unit 124. In some embodiments, the constituent elements of the processor 120 may be selectively included in or excluded from the processor 120. Furthermore, in some embodiments, the constituent elements of the processor 120 may be separated or incorporated for representation of functions of the processor 120.

Figure 5:
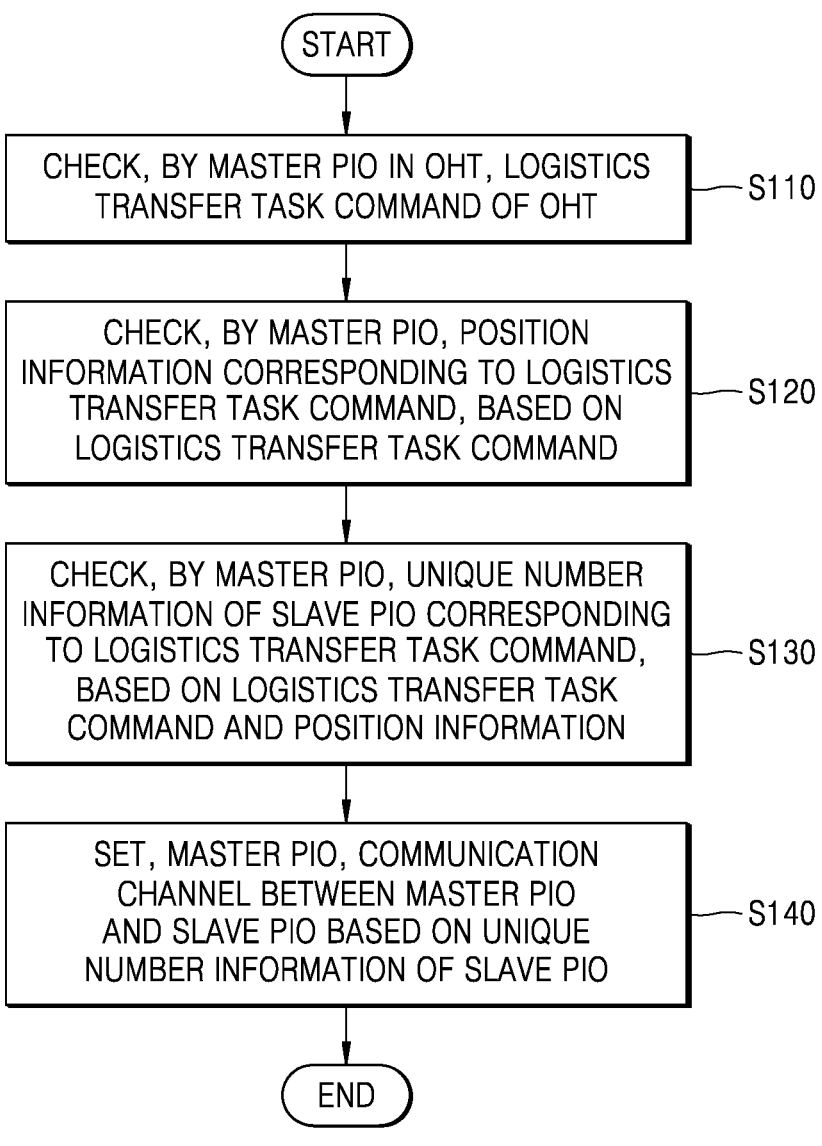
FIG. 5 is a flowchart of a communication channel setting method according to an embodiment.

The processor 120 and the constituent elements of the processor 120 may control the communication channel setting device 100 to perform operations (S110 to S140) included in a communication channel setting method of FIG. 5. For example, the processor 120 and the constituent elements of the processor 120 may be implemented to execute instructions according to code of an operating system and code of at least one program included in the memory 110. The constituent elements of the processor 120 may be representations of different functions of the processor 120 executed by the processor 120 according to the instructions provided by program code stored in the communication channel setting device 100. The internal configuration and detailed operations of the processor 120 are described below with reference to the flowchart of the communication channel setting method of FIG. 5.

FIG. 5 is a flowchart of a communication channel setting method according to an embodiment. Furthermore, FIG. 6 is a view for explaining a communication channel setting method according to an embodiment.

Figure 6:
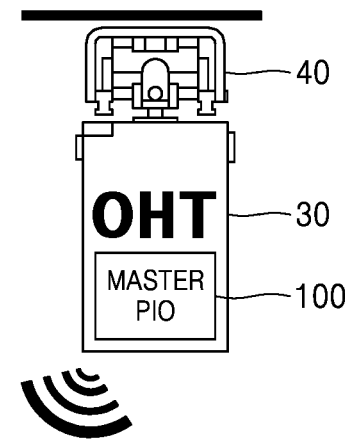
FIG. 6 is a view for explaining a communication channel setting method according to an embodiment.
Figure 6:
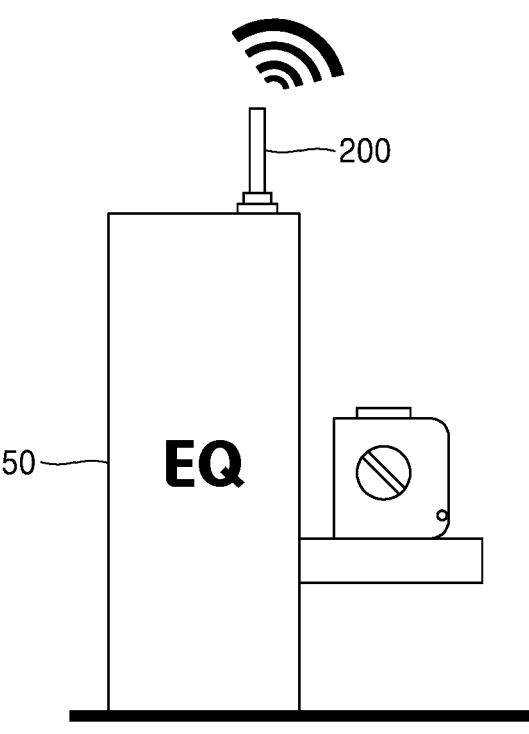

Referring to FIGS. 5 and 6 together, in operation S110, a master PIO 100 included in the OHT 30 according to an embodiment may check the logistics transfer task command of the OHT 30.

The master PIO 100 according to an embodiment may receive a logistics transfer task command from the OCS 20. For example, the logistics transfer task command may include position information, unique number information of a slave PIO 200, and communication channel information. For example, the position information may include position information of the OHT 30 to perform the logistics transfer task command with respect to map information including position information of a plurality of OHTs and a plurality of pieces of equipment. Furthermore, the unique number information of the slave PIO 200 may include information about the serial number (S/N) of the slave PIO 200. Furthermore, the communication channel information may include information about a communication channel for communication between the master PIO 100 and the slave PIO 200.

In operation S120, the master PIO 100 may check position information corresponding to the logistics transfer task command based on the logistics transfer task command.

According to an embodiment, the master PIO 100 may check map information that is previously stored. For example, referring to FIGS. 2 and 6 together, the map information may include position information of the OHT 30 with respect to at least one piece of equipment 50 corresponding to the logistics transfer task command. For example, the map information or the position information may include coordinates information.

Furthermore, the master PIO 100 may check whether the OHT 30 is located at a right position based on the map information and the position information corresponding to the logistics transfer task command. For example, the master PIO 100 according to an embodiment may check position information included in the logistics transfer task command. Furthermore, the master PIO 100 may check current position information of the OHT 30. For example, the current position information may include information about the current position of the OHT 30 in the map information. Furthermore, the master PIO 100 may check whether the OHT 30 is located at the right position by comparing the position information included in the logistics transfer task command with the current position information based on the map information. For example, when the position information included in the logistics transfer task command is the same as the current position information, the master PIO 100 may determine that the OHT 30 is currently located at the right position.

In operation S130, the master PIO 100 according to an embodiment may check the unique number information of the slave PIO 200 corresponding to the logistics transfer task command, based on the logistics transfer task command and the position information. For example, when the OHT 30 corresponds to the right position, the master PIO 100 according to an embodiment may check the unique number information of the slave PIO 200 corresponding to the position information included in the logistics transfer task command.

In an embodiment, the equipment 50 may include a plurality of slaves PIO. In this case, the master PIO 100 according to an embodiment may check the slave PIO 200 that is previously assigned and is a target of the logistics transfer task command, by using the unique number information of the slave PIO 200.

The master PIO 100 according to an embodiment may transmit a confirmation message to the slave PIO 200 corresponding to the unique number information of the slave PIO 200, based on the unique number information of the slave PIO 200 corresponding to the logistics transfer task command.

Furthermore, the master PIO 100 may receive a response message to the confirmation message from the slave PIO 200. Furthermore, the master PIO 100 may recognize the slave PIO 200 corresponding to the logistics transfer task command based on the response message. For example, referring to FIG. 6, the master PIO 100 may transmit a confirmation message to the slave PIO 200 that is previously assigned and is a target of the logistics transfer task command by using the unique number information of the slave PIO 200 included in the logistics transfer task command, and receive a response message to the confirmation message from the slave PIO 200 that is previously assigned, thereby recognizing the slave PIO 200 corresponding to the logistics transfer task command.

In operation S140, the master PIO 100 according to an embodiment may set a communication channel between the master PIO 100 and the slave PIO 200 based on the unique number information of the slave PIO 200.

For example, the master PIO 100 according to an embodiment may transmit communication channel information to the slave PIO 200 corresponding to the logistics transfer task command. Furthermore, the master PIO 100 may set a communication channel between the master PIO 100 and the slave PIO 200 corresponding to the logistics transfer task command, based on the communication channel information. For example, the master PIO 100 may transmit communication channel information previously assigned among a plurality of pieces of communication channel information, to the slave PIO 200 that is a target of the logistics transfer task command. In this case, the master PIO 100 and the slave PIO 200 may perform communication therebetween by using the previously assigned communication channel information.

The master PIO 100 according to the disclosure may set a communication channel such that no communication interference occurs between a plurality of OHTs and a plurality of pieces of equipment, by transmitting communication channel information previously assigned among a plurality of pieces of communication channel information to the slave PIO 200 that is a target of the logistics transfer task command.

Figure 7:
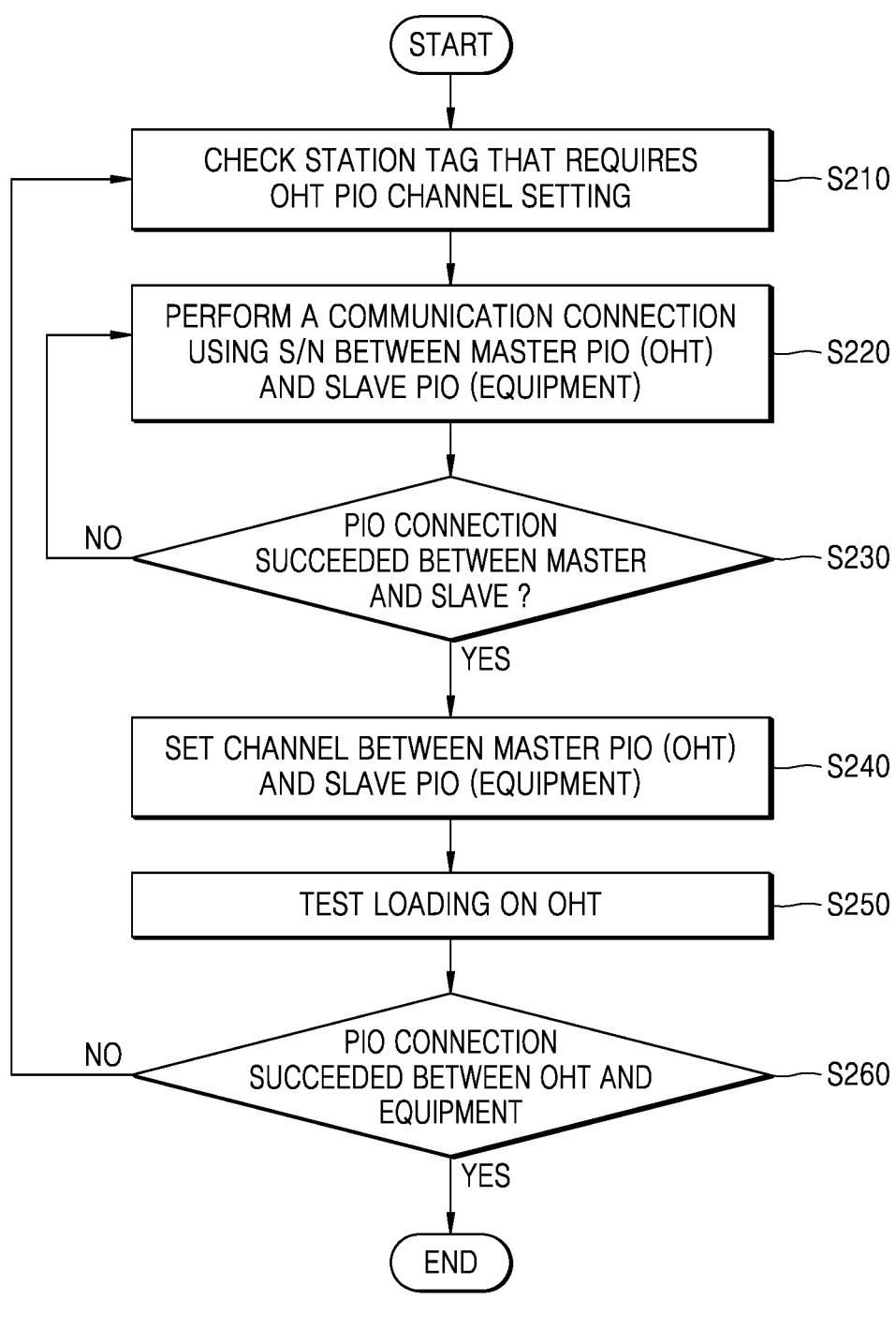
FIG. 7 is a flowchart of a communication channel setting method according to another embodiment.

FIG. 7 is a flowchart of a communication channel setting method according to another embodiment.

In operation S210, an OHT according to an embodiment may recognize the right position of the OHT with respect to position information (e.g., a station tag) that requires PIO channel setting. For example, the master PIO in the OHT may check whether the OHT corresponds to position information corresponding to a logistics transfer task command, based on the logistics transfer task command including the position information, the unique number information of the slave PIO (e.g., a S/N), and PIO channel information (e.g., communication channel information for communication between PIOs).

In operation S220, the master PIO according to an embodiment may perform a communication connection between the master PIO and the slave PIO by using the unique number information of the slave PIO. For example, the master PIO may check whether it is a slave PIO that is a target of the logistics transfer task command, by transmitting the unique number information of the slave PIO to the slave PIO. In this case, the slave PIO checks whether the unique number information of the slave PIO matches the unique number information received from the master PIO and notifies the master PIO of whether the slave PIO is one that is a target of the logistics transfer task command.

In operation S230, when the unique number information of the slave PIO transmitted by the master PIO matches the unique number information of the slave PIO to which the master PIO performs a communication connection, a communication connection may be set between the master PIO and the slave PIO.

In operation S240, the master PIO according to an embodiment may set a communication channel between the master PIO and the slave PIO, by transmitting communication channel information to the slave PIO.

In operations S250 and S260, the OHT according to an embodiment may perform logistics transfer based on the logistics transfer task command. Furthermore, logistics transfer may be performed by performing communication by using a communication channel set between the OHT including the master PIO and the equipment including the slave PIO.

According to the disclosure, an automatic communication connection between the master PIO of OHT and the slave PIO of equipment may be performed. Furthermore, due to the automatic communication connection between the master PIO of OHT and the slave PIO of equipment, a communication connection is made only to a slave PIO that needs to be connected, and thus, interference due to another slave PIO that is not a target of a logistics transfer task command may be reduced.

Furthermore, according to the disclosure, regardless of the position of the slave PIO of equipment, communication channel setting is possible, and fatal accidents may be reduced due to the reduction of work at height by workers.

Furthermore, according to the disclosure, a communication channel is not set directly by a worker, but a communication channel is automatically set between an OHT and equipment so that the possibility of human errors may be reduced.

The device and/or system described above may be implemented by hardware components, software components, and/or a combination of hardware components and software components. The device and components described in the embodiments may be implemented by using one or more general purpose computers or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of executing instructions and responding. A processing device may execute an operating system (OS) and one or more software applications executed on the OS. Furthermore, the processing device, in response to the execution of software, may access, store, manipulate, process, and generate data. For convenience of understanding, it may be described that one processing device is used, but one skilled in the art would understand that the processing device may include a plurality of processing elements and/or a plurality of types of processing elements. For example, the processing device may include a plurality of processors or one processor and one controller. Furthermore, another processing configuration, such as a parallel processor, is possible.

Software may include a computer program, code, instructions, or one or more combinations thereof, and may configure a processing device to operate as desired or independently or collectively command the processing device. Software and/or data, to be interpreted by a processing device or to provide a command or data to the processing device, may be embodied permanently or temporarily in a certain type of machine, a component, a physical device, virtual equipment, a computer storage medium or device, or transmitted signal waves. Software may be distributed on a network-connected computer system, and may be stored or executed in a distributed method. Software and data may be stored in one or more computer-readable recording media.

A method according to an embodiment may be implemented in the form of a program command executed through various computer means and recorded in a computer-readable medium. A computer-readable medium may include a program command, a data file, a data structure, and the like solely or by combining the same. A program command recorded on the computer-readable medium may be specially designed and configured for the disclosure or may be a usable one, such as computer software, which is well known to one of ordinary skill in the art to which the disclosure pertains to. A computer-readable recording medium may include magnetic media such as hard discs, floppy discs, and magnetic tapes, optical media such as CD-ROMs or DVDs, magneto-optical media such as floptical disks, and hardware devices such as ROM, RAM, flash memory, and the like which are specially configured to store and execute a program command. An example of a program command may include not only machine code created by a compiler, but also a high-level programming language executable by a computer using an interpreter. The hardware device may be configured to operate as one or more software modules to perform an operation of an embodiment, and vice versa.

Although embodiments of the disclosure have been described for illustrative purposes, those having ordinary knowledge in the technical field of the disclosure will appreciate that various modifications, additions and substitutions are possible, without departing from the scope and spirit of the disclosure as disclosed in the accompanying claims. For example, an appropriate result can be achieved even when the described technologies are performed in a different order from the described method, and/or constituent elements, such as the described system, structure, device, circuit, etc., are coupled or combined in a different form from the described method, or replaced or substituted by different constituent elements or equivalents.

Therefore, other implements equivalent to some embodiments and the claims fall within the scope of the claims described below.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of setting a communication channel of an overhead hoist transfer (OHT), the method comprising:

receiving, by a master parallel input/output (PIO) provided in the OHT, a logistics transfer task command of the OHT;

checking, by the master PIO, position information corresponding to the logistics transfer task command, based on the logistics transfer task command;

checking, by the master PIO, unique number information of a slave PIO provided with a slave OHT corresponding to the logistics transfer task command, based on the logistics transfer task command and the position information; and setting, by the master PIO, a communication channel between the master PIO and the slave PIO, based on the unique number information of the slave PIO, causing the slave OT to travel according to an information received through the communication channel, wherein the checking of the position information corresponding to the logistics transfer task command comprises:

checking, by the master PIO, map information that is previously stored; and checking, by the master PIO, whether the OHT is located at a right position, based on the map information and the position information, wherein the map information comprises position information of the OHT with respect to at least one piece of equipment corresponding to the logistics transfer task command, wherein the checking of whether the OHT is located at a right position comprises:

checking the position information included in the logistics transfer task command;

checking current position information of the OHT; and checking whether the OHT is located at a right position by comparing the position information included in the logistics transfer task command with the current position information, based on the map information, and wherein the checking of the unique number information of the slave PIO comprises, when the OHT is located at a right position, checking the position information included in the unique number information of the slave PIO corresponding to the logistics transfer task command.

2. The method of claim 1, wherein the checking, by the master PIO, of the logistics transfer task command comprises receiving, by the master PIO, the logistics transfer task command from an OHT control system (OCS).

3. The method of claim 1, wherein the logistics transfer task command comprises the position information, the unique number information of the slave PIO, and communication channel information.

4. The method of claim 1, wherein the checking of the unique number information of the slave PIO comprises:

transmitting, by the master PIO, a confirmation message to the slave PIO corresponding to the unique number information of the slave PIO, based on the unique number information of the slave PIO corresponding to the logistics transfer task command; and receiving, by the master PIO, a response message to the confirmation message from the slave PIO.

5. The method of claim 4, wherein the checking of the unique number information of the slave PIO further comprises recognizing, by the master PIO, the slave PIO corresponding to the logistics transfer task command, based on the response message.

6. The method of claim 5, wherein the setting of the communication channel comprises:

transmitting, by the master PIO, communication channel information to the slave PIO corresponding to the logistics transfer task command; and setting a communication channel between the master PIO and the slave PIO corresponding to the logistics transfer task command, based on the communication channel information.

7. A non-transitory computer-readable recording medium having recorded thereon a program for executing the method defined in claim 1.

8. A device for setting a communication channel of an overhead hoist transfer (OHT), the device comprising a processor, wherein the processor is configured to:

receive check a logistics transfer task command of the OHT, check position information corresponding to the logistics transfer task command, based on the logistics transfer task command, check unique number information of a slave parallel input/output (PIO) provided with a slave OHT corresponding to the logistics transfer task command, based on the logistics transfer task command and the position information, and set a communication channel between a master PIO and the slave PIO, based on the unique number information of the slave PIO, and cause the slave OHT to travel according to an information received through the communication channel, wherein the processor is further configured to control the master PIO to check map information that is previously stored, and check whether the OHT is located at a right position, based on the map information and the position information, wherein the map information comprises position information of the OHT with respect to at least one piece of equipment corresponding to the logistics transfer task command, wherein the processor is further configured to:

check the position information included in the logistics transfer task command, check current position information of the OHT, and check whether the OHT is located at a right position by comparing the position information included in the logistics transfer task command with the current position information, based on the map information, and wherein the processor is further configured to, when the OHT is located at a right position, check the position information included in the unique number information of the slave PIO corresponding to the logistics transfer task command.

9. The device of claim 8,
wherein the processor is further configured to receive the logistics transfer task command from an OHT control system (OCS).

10. The device of claim 8,
wherein the logistics transfer task command comprises the position information, the unique number information of the slave PIO, and communication channel information.

11. The device of claim 8, wherein the processor is further configured to transmit a confirmation message to the slave PIO corresponding to the unique number information of the slave PIO, based on the unique number information of the slave PIO corresponding to the logistics transfer task command, receive a response message to the confirmation message from the slave PIO, and recognize the slave PIO corresponding to the logistics transfer task command, based on the response message.

12. The device of claim 11, wherein the processor is further configured to transmit communication channel information to the slave PIO corresponding to the logistics transfer task command, and set a communication channel between the master PIO and the slave PIO corresponding to the logistics transfer task command, based on the communication channel information.

* * * * *